(12) United States Patent
Li et al.

(10) Patent No.: US 12,526,429 B2
(45) Date of Patent: Jan. 13, 2026

(54) IMAGE ENCODING QUANTITY PARAMETER UPDATE METHOD, ELECTRONIC DEVICE, AND STORAGE MEDIUM

(71) Applicant: SHANGHAI BILIBILI TECHNOLOGY CO., LTD., Shanghai (CN)

(72) Inventors: Xiaobo Li, Shanghai (CN); Tianxiao Ye, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/695,797

(22) PCT Filed: Jun. 14, 2022

(86) PCT No.: PCT/CN2022/098753
§ 371 (c)(1),
(2) Date: Mar. 26, 2024

(87) PCT Pub. No.: WO2023/045420
PCT Pub. Date: Mar. 30, 2023

(65) Prior Publication Data
US 2024/0406401 A1  Dec. 5, 2024

(30) Foreign Application Priority Data
Sep. 27, 2021 (CN) .......................... 202111137769.4

(51) Int. Cl.
*H04N 19/136* (2014.01)
*H04N 19/119* (2014.01)
(Continued)

(52) U.S. Cl.
CPC ......... *H04N 19/136* (2014.11); *H04N 19/119* (2014.11); *H04N 19/129* (2014.11); *H04N 19/167* (2014.11); *H04N 19/184* (2014.11)

(58) Field of Classification Search
None
See application file for complete search history.

(56) References Cited

U.S. PATENT DOCUMENTS 9,641,846 B2 * 5/2017 Coban .................... H04N 19/46
9,667,977 B2 * 5/2017 Kumakura ........... H04N 19/176
(Continued)

FOREIGN PATENT DOCUMENTS

| CN | 101039430 A | 9/2007 |
| CN | 101743751 A | 6/2010 |

(Continued)

OTHER PUBLICATIONS

International Patent Application No. PCT/CN2022/098753; Int'l Search Report; dated Sep. 7, 2022; 2 pages.

*Primary Examiner* — Chikaodili E Anyikire
(74) *Attorney, Agent, or Firm* — BakerHostetler

(57) ABSTRACT

The present disclosure provides techniques for image processing. The techniques comprise obtaining a residual coefficient matrix of a target image, the residual coefficient matrix including at least one non-zero coefficient; determining a maximum scan ordinal for the residual coefficient matrix; sequentially reading a predetermined number of residual coefficients in the residual coefficient matrix in a horizontal scanning mode; updating an encoding quantity parameter for the residual coefficient matrix based on an ordinal comparison result between a scan ordinal of each of the read residual coefficients and the maximum scan ordinal and a coefficient value of each of the read residual coefficients; and determining an encoding bit number of the (Continued)

residual coefficient matrix based on a final encoding quantity parameter after reading all residual coefficients in the residual coefficient matrix.

20 Claims, 6 Drawing Sheets

(51) Int. Cl.
   *H04N 19/129* (2014.01)
   *H04N 19/167* (2014.01)
   *H04N 19/184* (2014.01)

(56) References Cited

U.S. PATENT DOCUMENTS

| | | | |
|---|---|---|---|
| 2005/0123207 A1* | 6/2005 | Marpe | H04N 19/91 375/E7.138 |
| 2009/0180161 A1 | 7/2009 | Iwamoto | |
| 2009/0219988 A1* | 9/2009 | Cammas | H04N 19/61 375/E7.026 |
| 2012/0140822 A1* | 6/2012 | Wang | H04N 19/197 375/240.18 |
| 2012/0262313 A1* | 10/2012 | He | H03M 7/40 341/87 |
| 2015/0071359 A1* | 3/2015 | Guo | H04N 19/91 375/240.18 |
| 2015/0181237 A1* | 6/2015 | Tsukuba | H04N 19/134 382/233 |
| 2017/0357616 A1 | 12/2017 | Budagavi et al. | |
| 2018/0288409 A1 | 10/2018 | Heo et al. | |
| 2019/0058883 A1* | 2/2019 | Chiang | H04N 19/13 |
| 2020/0021855 A1 | 1/2020 | Kuusela et al. | |
| 2021/0014479 A1* | 1/2021 | Lee | H04N 19/105 |

FOREIGN PATENT DOCUMENTS

| | | |
|---|---|---|
| CN | 102625096 A | 8/2012 |
| CN | 110741636 A | 1/2020 |
| CN | 113873252 A | 12/2021 |
| WO | WO 2019/127003 A1 | 7/2019 |

* cited by examiner

| 1 | 9 | 17 | 25 | 33 | 41 | 49 | 57 |
|---|---|----|----|----|----|----|----|
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| 8 | 16 | 24 | 32 | 40 | 48 | 56 | 64 |

FIG. 2B

| 1 | -3 | 0 | 2 | -5 | 15 | 0 | 0 |
|---|----|---|---|----|----|---|---|
| 0 | 0 | 8 | 1 | -5 | 0 | 0 | 0 |
| 2 | -1 | 3 | 0 | 0 | 0 | 0 | 0 |
| -8 | 3 | 0 | 0 | 0 | 0 | 0 | 0 |
| 5 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 2C

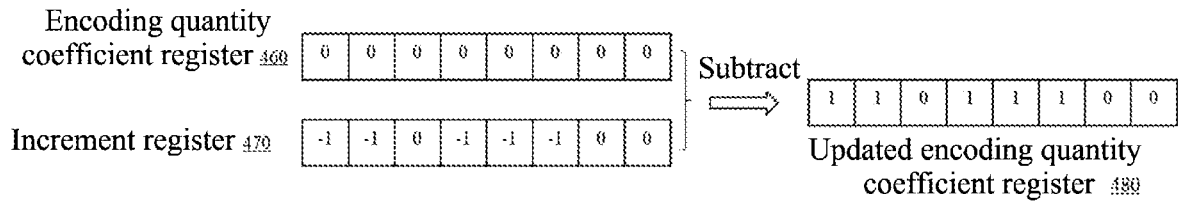

| S502: A most significant bit of a binary representation of a difference between each of one or more first residual coefficients and a predetermined threshold may be determined |

↓

| S504: A compensation encoding quantity parameter for each of the one or more first residual coefficients may be determined based on a corresponding most significant bit |

↓

| S506: An encoding quantity parameter may be updated using the compensation encoding quantity parameters of the one or more first residual coefficients |

FIG. 5

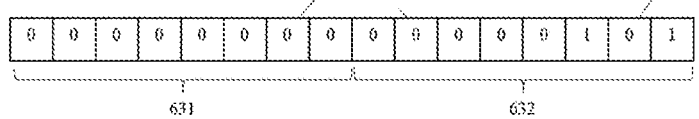

FIG. 6

IMAGE ENCODING QUANTITY PARAMETER UPDATE METHOD, ELECTRONIC DEVICE, AND STORAGE MEDIUM

CROSS-REFERENCE TO RELATED APPLICATION

The present disclosure is the U.S. National Stage of International Application No. PCT/CN2022/098753, filed on Jun. 14, 2022, which claims priority to Chinese Patent Application 202111137769.4, filed on Sep. 27, 2021, which are incorporated herein by reference in their entireties.

TECHNICAL FIELD

The present disclosure relates to the field of image and video processing technologies, and specifically to an image processing method, an image processing apparatus, an electronic device, a computer-readable storage medium, and a computer program product.

BACKGROUND ART

Image or video data has strong spatial correlation, and has a lot of redundant information in a spatial domain. The transform encoding technology may transform image or video data from a spatial domain to a frequency domain, which greatly reduces redundant information, to compress the image or video data, thereby helping store and transmit the image or video data.

In a video compression scenario, each video frame may be subjected to processing such as prediction, transform, quantization, and entropy encoding on an encoder side, to obtain a code of each video frame; then encoded data is subjected to processing such as entropy decoding, inverse quantization, and inverse transform on a decoder side, to restore each video frame.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY OF THE INVENTION

The present disclosure provides an image processing method, an image processing apparatus, an electronic device, a computer-readable storage medium, and a computer program product.

According to an aspect of the present disclosure, there is provided an image processing method, including: obtaining a residual coefficient matrix of a target image, where the residual coefficient matrix includes at least one non-zero coefficient; determining a maximum scan ordinal for the residual coefficient matrix; sequentially reading a predetermined number of residual coefficients in the residual coefficient matrix in a horizontal scanning mode; updating an encoding quantity parameter for the residual coefficient matrix based on an ordinal comparison result between a scan ordinal of each of the read residual coefficients and the maximum scan ordinal and a coefficient value of each of the read residual coefficients; and determining an encoding bit number for the residual coefficient matrix based on a final encoding quantity parameter after reading all the residual coefficients in the residual coefficient matrix, where the scan ordinal of the residual coefficient is determined based on a preset scanning mode that is different from the horizontal scanning mode.

According to another aspect of the present disclosure, there is further provided an image processing apparatus, including: a residual coefficient obtaining unit configured to obtain a residual coefficient matrix of a target image, where the residual coefficient matrix includes at least one non-zero coefficient; a maximum scan ordinal determining unit configured to determine a maximum scan ordinal for the residual coefficient matrix; a reading unit configured to sequentially read a predetermined number of residual coefficients in the residual coefficient matrix in a horizontal scanning mode; an update unit configured to update an encoding quantity parameter for the residual coefficient matrix based on an ordinal comparison result between a scan ordinal of each of the read residual coefficients and the maximum scan ordinal and a coefficient value of each of the read residual coefficients; and an encoding bit number generation unit configured to determine an encoding bit number for the residual coefficient matrix based on a final encoding quantity parameter after reading all the residual coefficients in the residual coefficient matrix.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program that, when executed by a processor, implements the above method.

According to another aspect of the present disclosure, there is further provided a computer program product, including a computer program that, when executed by a processor, implements the above method.

Through the utilization of the embodiments provided in the present disclosure, the residual coefficients in the residual coefficient matrix may be read in a horizontal scanning mode, thereby solving the problem of being unable to continuously read data in the case of non-horizontal scanning, and increasing a speed for reading data of the residual coefficient matrix.

It should be understood that the content described in this section is not intended to identify critical or important features of the embodiments of the present disclosure, and is not used to limit the scope of the present disclosure either. Other features of the present disclosure will be easily understood through the following description.

BRIEF DESCRIPTION OF THE DRAWINGS

The accompanying drawings exemplarily show embodiments and form a part of the specification, and are used to explain exemplary implementations of the embodiments together with a written description of the specification. The embodiments shown are merely for illustrative purposes and do not limit the scope of the claims. Throughout the accompanying drawings, the same reference numerals denote similar but not necessarily same elements.

FIG. 1 is a flowchart of an image processing method according to an embodiment of the present disclosure;

FIGS. 2A and 2B are schematic diagrams of scan orders in two exemplary non-horizontal scanning modes, respectively;

FIG. 2C shows an example of a residual coefficient matrix according to an embodiment of the present disclosure;

FIG. 3 is an exemplary flowchart of a method for updating an encoding quantity parameter according to an embodiment of the present disclosure;

FIGS. 4A, 4B, and 4C are schematic diagrams of registers according to an embodiment of the present disclosure;

FIG. 5 is an exemplary flowchart of a method for determining a compensation encoding quantity parameter according to an embodiment of the present disclosure;

FIG. 6 shows an example of a difference register according to an embodiment of the present disclosure;

DETAILED DESCRIPTION OF EMBODIMENTS

Figures 1, 2A:
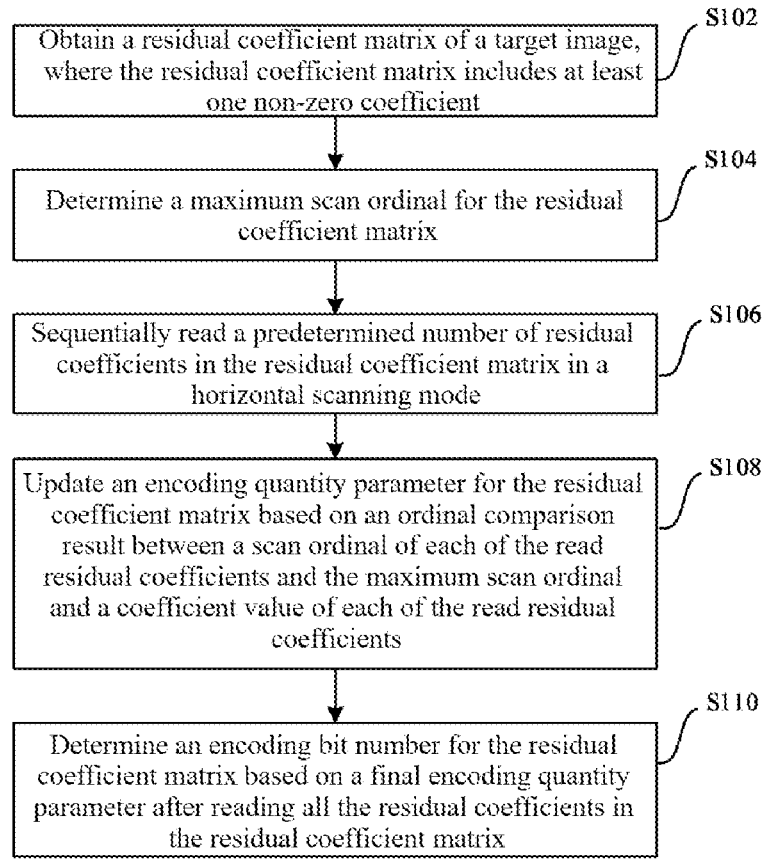

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

The embodiments of the present disclosure will be described below in detail with reference to the accompanying drawings.

For ease of understanding, a brief introduction of an image or video transform encoding process is given first.

A video frame may be composed of multiple different channels, for example, a YUV video frame is composed of a luma channel (Y), a first chroma channel (U), and a second chroma channel (V). Accordingly, a video frame may include a plurality of image blocks of different channels, for example, a YUV video frame may include a luma image block, a first chroma image block, and a second chroma image block.

The general process of image encoding is as follows: An image is divided into a plurality of image blocks and is transformed and encoded with the image block as a transform unit (TU). The image block may be, for example, a square image with a size of 4*4, 8*8, 16*16, 32*32, or 64*64, or a rectangular image block with a size of 4*8 or 8*4. Those skilled in the art may determine a size of the image block according to actual conditions.

An image of an original video frame may be subjected to processing such as prediction, transform, quantization, entropy encoding, inverse quantization, inverse transform, reconstruction, and filtering, so as to output an encoded stream of the video. In the video encoding process, the original video frame is used as an input of an adder, predicted data outputted by an intra-frame prediction encoding module or an inter-frame prediction encoding module is used as another input of the adder, and the adder outputs a predicted residual matrix. The predicted residual matrix is subjected to transform and quantization processing, to obtain a residual coefficient matrix. The residual coefficient matrix is subjected to inverse quantization and inverse transform processing, to restore the predicted residual matrix. The restored predicted residual matrix may be used to reconstruct the video frame.

In a video decoding process, the received encoded stream may be subjected to entropy decoding, to obtain the residual coefficient matrix, inter-frame prediction related information, intra-frame prediction related information, etc. The residual coefficient matrix is subjected to inverse quantization and inverse transform processing, to restore the predicted residual matrix. The reconstruction module adds the predicted residual back to the corresponding intra-frame prediction data or inter-frame prediction data. The intra-frame prediction data or inter-frame prediction data may be selected for use by using a switch to obtain the reconstructed frame.

In the video encoding process, an intra-frame encoding prediction module may process the original video frame by using different prediction methods, to obtain the residual coefficient matrix. For example, prediction may be performed by using methods such as unidirectional prediction, bidirectional prediction, spatial domain prediction, and time domain prediction. It can be understood that the smaller the size of the residual coefficient matrix, the smaller the size of the encoded stream. To optimize the size of the residual coefficient matrix, after residual coefficient matrices obtained by using different prediction methods are obtained, a number of bits required to encode each of the residual coefficient matrices may be calculated, and a residual coefficient matrix that requires the smallest number of bits required for encoding is selected for the subsequent encoding process.

In view of this, the present disclosure provides an improved image processing method. A speed for calculating a number of bits required for a coefficient matrix may be increased by using the method provided in the present disclosure.

The image processing method in this embodiment of the present disclosure will be described in detail below with reference to the accompanying drawings.

FIG. 1 is a flowchart of an image processing method 100 according to an embodiment of the present disclosure. As shown in FIG. 1, the method 100 may include:

step S102: obtaining a residual coefficient matrix of a target image, where the residual coefficient matrix includes at least one non-zero coefficient;

step S104: determining a maximum scan ordinal for the residual coefficient matrix;

step S106: sequentially reading a predetermined number of residual coefficients in the residual coefficient matrix in a horizontal scanning mode;

step S108: updating an encoding quantity parameter for the residual coefficient matrix based on an ordinal comparison result between a scan ordinal of each of the read residual coefficients and the maximum scan ordinal and a coefficient value of each of the read residual coefficients; and step S110: determining an encoding bit number for the residual coefficient matrix based on a final encoding quantity parameter after reading all the residual coefficients in the residual coefficient matrix, where the scan ordinal of the residual coefficient is determined based on a predetermined scanning mode that is different from the horizontal scanning mode.

Through the utilization of the image processing method provided in the present disclosure, for the residual coefficient matrix scanned in a mode that is different from the horizontal scanning mode, the residual coefficients in the residual coefficient matrix are read in the horizontal scanning mode, and the encoding quantity parameter for the scanned residual coefficient that is read is determined. Since the residual coefficients in the residual coefficient matrix are generally stored by rows, through the utilization of the method provided in the present disclosure, the residual coefficients in the residual coefficient matrix may be read in the horizontal scanning mode, thereby solving the problem of being unable to continuously read data in the case of non-horizontal scanning, and increasing a data reading speed for scanning the residual coefficient matrix in a non-horizontal scanning mode.

The target image described here may refer to the original video frame described above or any image that needs to be encoded.

In some embodiments, the final encoding quantity parameter determined in step S110 may indicate a number of non-zero coefficients in the residual coefficient matrix. An encoding bit number for the residual coefficient matrix may be determined based on the final encoding quantity parameter and a number of bits required to encode each non-zero coefficient. In some other embodiments, the final encoding quantity parameter determined in step S110 may indicate the number of non-zero coefficients in the residual coefficient matrix and a compensation encoding quantity parameter for a first residual coefficient greater than a threshold. In some implementations, the compensation encoding quantity parameter may indicate a compensation encoding quantity parameter for a specific residual coefficient, and the final encoding quantity parameter may be determined based on a sum of the compensation encoding quantity parameter and the number of non-zero coefficients in the residual coefficient matrix. Further, the encoding bit number for the residual coefficient matrix may be determined based on the final encoding quantity parameter and the number of bits required to encode each non-zero coefficient.

In some embodiments, the encoding bit number for the residual coefficient matrix may be compared with an encoding bit number for another residual coefficient matrix of the target image, where the residual coefficient matrix and the another residual coefficient matrix are obtained by using different prediction methods. One of the residual coefficient matrix and the another residual coefficient matrix that has a smaller encoding bit number may be selected to encode the target image. The residual coefficient matrix involved in the method 100 is a first residual coefficient matrix obtained based on a first prediction method. The target image may also be processed by using a second prediction method that is different from the first prediction method, to obtain another residual coefficient matrix of the target image, that is, a second residual coefficient matrix. One of the first residual coefficient matrix and the second residual coefficient matrix that has a smaller encoding bit number may be selected to encode the target image. In other words, the target image may be encoded based on one of the first residual coefficient matrix and the second residual coefficient matrix that has a smaller encoding bit number.

The maximum scan ordinal of the residual coefficient matrix involved in this embodiment of the present disclosure is determined based on a predetermined scanning mode for the residual coefficient matrix. FIGS. 2A and 2B are schematic diagrams of scan orders in two exemplary non-horizontal scanning modes, respectively.

FIG. 2A is a schematic diagram of a scan order table for z-type scanning. As shown in FIG. 2A, during z-type scanning, pixels in the image block are sequentially read, starting from a first pixel in an upper left corner of the image block, in a z-type manner according to the scan order shown in FIG. 2A.

FIG. 2B is a schematic diagram of a scan order table for vertical scanning. As shown in FIG. 2B, during vertical scanning, pixels in the image block are read by columns, starting from a first pixel in an upper left corner of the image block, according to the scan order shown in FIG. 2B.

In the related art, the residual coefficients in the scanned residual coefficient matrix are stored in a storage device by rows. Therefore, when the image block is processed in a scanning mode other than horizontal scanning, the stored residual coefficients cannot be continuously read. This makes the program very time-consuming and not conducive to single instruction multiple data (SIMD) optimization.

FIG. 2C shows an example of a residual coefficient matrix according to an embodiment of the present disclosure. The residual coefficient matrix shown in FIG. 2C is 8*8, that is, it has eight rows and eight columns. The principle of the present disclosure will be described in conjunction with the residual coefficient matrix shown in FIG. 2C. However, it can be understood that, as mentioned above, a structure of the residual coefficient matrix is not limited to the example shown in FIG. 2C. Without departing from the principle of the present disclosure, the residual coefficient matrix may alternatively be of other sizes such as 16*16, 32*32, 4*8, 8*4, etc.

After quantization, a position of a last non-zero coefficient in the residual coefficient matrix may be obtained. For example, a last transform quantization coefficient of each processed image block may be identified by an end of block (EOB) symbol. The position of the last non-zero coefficient in the residual coefficient matrix (that is, a row and a column where it is located) may be determined based on the EOB symbol in a transform quantization result. It can be understood that the position of the "last non-zero coefficient" described here is related to the scanning mode for the image block. In other words, the maximum scan ordinal may be determined based on a scan order table for the residual coefficient matrix that is corresponding to the predetermined scanning mode and the position of the last non-zero coefficient in the residual coefficient matrix. The residual coefficient matrix shown in FIG. 2C is used as an example. In the z-type scanning mode, the last non-zero coefficient is the coefficient −5 in the $2^{nd}$ row and the $5^{th}$ column. If another scanning mode such as vertical scanning is used, the last non-zero coefficient is the coefficient 6 in the $1^{st}$ row and the $6^{th}$ column. The residual coefficient matrix shown in FIG. 2C is used as an example. In the case of z-type scanning, the maximum scan ordinal for the last non-zero coefficient is 17.

In some embodiments, the read residual coefficients may be stored in a register. In some implementations, a number of residual coefficients that can be stored in the register may be the same as a number of residual coefficients included in one row of the residual coefficient matrix. In this case, each time one row of residual coefficients in the residual coefficient matrix is read, the read one row of residual coefficients is processed to determine a number of non-zero coefficients in the read one row of residual coefficients. In some other implementations, the number of residual coefficients that can be stored in the register may alternatively be different from the number of residual coefficients included in one row of the residual coefficient matrix. In this case, the register sequentially reads the coefficients in the residual coefficient matrix in the horizontal scanning mode, and the read residual coefficients are processed to determine the number of non-zero coefficients in the read residual coefficients. For example, the register may read two rows of coefficients or half a row of coefficients in the residual coefficient matrix at a time.

The principle of the present disclosure will be described below by using an example where the number of residual coefficients that can be stored in the register is the same as the number of residual coefficients included in one row of the residual coefficient matrix. A plurality of bits may be included at each position in the coefficient register. In some embodiments, there are a total of 128 bits in the coefficient register, where every 16 bits may be used for representing one residual coefficient. Therefore, the register may be divided into eight positions, at which eight residual coefficients in one row of the residual coefficient matrix can be stored, respectively. In some other embodiments, the coefficient register may alternatively have another size such as 64 bits, 256 bits, or 512 bits, and those skilled in the art may select a coefficient register having a suitable size according to actual conditions.

Figures 3, 4A, 4B:
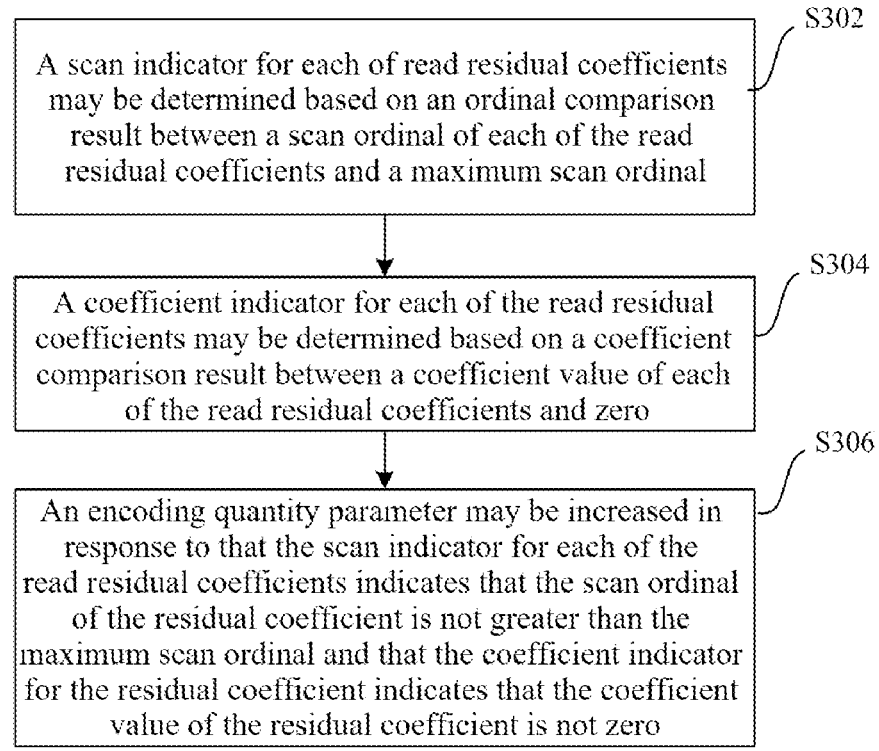

FIG. 3 is an exemplary flowchart of a method for updating an encoding quantity parameter according to an embodiment of the present disclosure. The method 100 shown in FIG. 1 may be performed through the process shown in FIG. 3.

In step S302, a scan indicator for each of the read residual coefficients may be determined based on the ordinal comparison result between the scan ordinal of each of the read residual coefficients and the maximum scan ordinal. A first scan indicator indicates that the scan ordinal of the residual coefficient is not greater than the maximum scan ordinal, and a second scan indicator indicates that the scan ordinal of the residual coefficient is greater than the maximum scan ordinal.

The scan ordinal of each read residual coefficient may be determined based on a scan order table for a preset scan order. For example, the scan order table for the residual coefficient matrix may be determined based on the size and scanning mode of the residual coefficient matrix. The scan order table for z-type scanning shown in FIG. 2A may be used for z-type scanning of the residual coefficient matrix in FIG. 2C. If vertical scanning is performed on the residual coefficient matrix shown in FIG. 2C, the scan order table shown in FIG. 2B may be used.

In some embodiments, a predetermined number of scan ordinals respectively corresponding to the predetermined number of residual coefficients may be read into a scan ordinal register in a horizontal scanning mode. A size of the scan ordinal register is the same as that of the coefficient register.

For each position in the scan ordinal register, a scan indicator corresponding to the position in a scan indicator register is determined as the first scan indicator in response to the scan ordinal at the position being not greater than the maximum scan ordinal; and the scan indicator corresponding to the position in a scan indicator register is determined as the second scan indicator in response to the scan ordinal at the position being greater than the maximum scan ordinal, the second scan indicator being different from the first scan indicator.

In some examples, the maximum scan ordinal may be stored in a comparison register that has a same size as the scan ordinal register. A maximum scan ordinal is stored at each position in the comparison register. A value in the scan ordinal register may be compared with a value at a corresponding position in the comparison register to obtain, in parallel, an ordinal comparison result between a scan ordinal of a read residual coefficient and the maximum scan ordinal, so that the read coefficients may be processed in parallel.

FIG. 4A is a schematic diagram of a scan ordinal register 410 and a scan indicator register 420 according to an embodiment of the present disclosure. As shown in FIG. 4A, when the first row of the residual coefficient matrix is to be processed, the scan ordinals for the positions in the first row of the residual coefficient matrix are stored in the scan ordinal register, which are 1, 2, 5, 6, 15, 16, 28, and 29, respectively. In some implementations, the scan ordinals may be read by reading the first row of data in the scan order table shown in FIG. 2A. The scan ordinal read at each position in the scan ordinal register 410 may be compared with the maximum scan ordinal 17. The scan ordinals stored at the first position to the sixth position in the scan ordinal register are not greater than the maximum scan ordinal 17. Therefore, the scan ordinals stored at the corresponding first position to the sixth position in the scan indicator register 420 may be determined as the first scan indicator. The scan ordinals stored at the seventh position and the eighth position in the scan ordinal register are greater than the maximum scan ordinal 17. Therefore, the scan ordinals stored at the corresponding seventh position and the eighth position in the scan indicator register may be determined as the second scan indicator that is different from the first scan indicator. In some examples, the first scan indicator may be represented as binary all ones, and the second scan indicator may be represented as binary all zeros. The first scan indicator (−1) and the second scan indicator (0) are shown in decimal mode in FIG. 4A.

In step S304, a coefficient indicator for each of the read residual coefficients may be determined based on a coefficient comparison result between the coefficient value of each of the read residual coefficients and zero. A first coefficient indicator indicates that the coefficient value of the residual coefficient is not zero, and a second coefficient indicator indicates that the coefficient value of the residual coefficient is zero.

In some embodiments, the predetermined number of residual coefficients may be read into the coefficient register in the horizontal scanning mode.

For each position in the coefficient register, a coefficient indicator corresponding to the position in a coefficient indicator register may be determined as the first coefficient indicator in response to a coefficient value of a residual coefficient at the position being not equal to zero; and the coefficient indicator corresponding to the position in the coefficient indicator register may be determined as the second coefficient indicator in response to the coefficient value of the residual coefficient at the position being equal to zero, the second coefficient indicator being different from the first coefficient indicator.

As shown in the coefficient register 430 shown in FIG. 4B, the first row of residual coefficients in the residual coefficient matrix shown in FIG. 2C may be read into the coefficient register. In some other implementations, absolute values of the residual coefficients in the residual coefficient matrix may also be read into the coefficient register, such as the coefficient register 440 shown in FIG. 4B.

The coefficient values stored in the coefficient register may be compared with zero, and the coefficient indicators in the coefficient indicator register may be determined based on coefficient comparison results.

For the coefficient register 430, the coefficient indicators may be determined by determining whether the coefficient values stored in the coefficient register 430 are equal to zero. For the coefficient value at each position in the coefficient register 430, if it is determined that the coefficient value at the position is equal to zero, a coefficient indicator at a corresponding position in the coefficient indicator register may be determined as the second coefficient indicator. When it is determined that the coefficient value at the position is not equal to zero, the coefficient indicator at the corresponding position in the coefficient indicator register may be determined as the first coefficient indicator.

For the coefficient register 440, the coefficient indicators may be determined by determining whether the coefficient values stored in the coefficient register 440 are greater than zero. For the coefficient value at each position in the coefficient register 440, if it is determined that the coefficient value at the position is greater than zero, a coefficient indicator at a corresponding position in the coefficient indicator register may be determined as the first coefficient indicator. When it is determined that the coefficient value at the position is not greater than zero, the coefficient indicator at the corresponding position in the coefficient indicator register may be determined as the second coefficient indicator.

In some examples, the first coefficient indicator may be represented as binary all ones, and the second coefficient indicator may be represented as binary all zeros. The first coefficient indicator (−1) and the second coefficient indicator (0) are shown in decimal mode in FIG. 4B.

In step S306, the encoding quantity parameter may be increased in response to that the scan indicator for each of the read residual coefficients indicates that the scan ordinal of the residual coefficient is not greater than the maximum scan ordinal and that the coefficient indicator for the residual coefficient indicates that the coefficient value of the residual coefficient is not zero.

The encoding quantity parameter may indicate an encoding quantity for the residual coefficients in the residual coefficient matrix. In some embodiments, each non-zero coefficient in the residual coefficient matrix requires 512 bits for encoding, while a zero coefficient does not need to be encoded. Therefore, a number of non-zero coefficients in the residual coefficient matrix may be calculated as the encoding quantity parameter, to indicate a number of bits required to encode the residual coefficient matrix.

The encoding quantity parameter may include a predetermined number of encoding quantity coefficients stored in an encoding quantity coefficient register, where a size of the encoding quantity coefficient register is the same as that of the coefficient register, and an encoding quantity coefficient at each position in the encoding quantity coefficient register may be used for a residual coefficient at a corresponding position in the coefficient register. The encoding quantity parameter may be a sum of all encoding quantity coefficients in the encoding quantity coefficient register.

An AND operation is performed on a coefficient indicator stored at each position in a coefficient indicator register and a scan indicator stored at a corresponding position in a scan indicator register to obtain an increment for an encoding quantity coefficient stored at each position in the encoding quantity coefficient register. Each encoding quantity coefficient in the encoding quantity coefficient register may be updated using the increment.

FIG. 4C show an example of an increment register and an encoding quantity coefficient register according to an embodiment of the present disclosure.

An AND operation is performed for the scan indicator register shown in FIG. 4A and the coefficient indicator register shown in FIG. 4B, so that the results in the increment register shown in FIG. 4C may be obtained. A number at each position in the increment register may indicate an increment for an encoding quantity coefficient of a coefficient at a corresponding position in the coefficient register. As shown in FIG. 4C, the results at the $1^{st}$, $2^{nd}$, $4^{th}$, $5^{th}$, and $6^{th}$ positions in the increment register are −1, which indicates that the scan ordinals of the residual coefficients at the $1^{st}$, $2^{nd}$, $4^{th}$, $5^{th}$, and $6^{th}$ positions in the coefficient register are less than the maximum scan ordinal, and the coefficient values of the residual coefficients are not zero. In other words, the residual coefficients at the 1, $2^{nd}$, $4^{th}$, $5^{th}$, and $6^{th}$ positions in the coefficient register are non-zero coefficients that need to be scanned.

Before values of the residual coefficients in the residual coefficient matrix are read for the first time, the encoding quantity coefficient register may be initialized and an encoding quantity coefficient at each position in the encoding quantity coefficient register may be initialized to zero.

After an increment for a read residual coefficient in a current coefficient register is determined, a value at each position in the encoding quantity coefficient register may subtract a value at each position in the increment register, to update each encoding quantity coefficient in the encoding quantity coefficient register. Since an increment of −1 indicates that the residual coefficient at the position is a non-zero coefficient that needs to be scanned, after the encoding quantity coefficient register subtracts the increment register, a number of non-zero coefficients that need to be scanned in currently scanned residual coefficients may be accumulated into the encoding quantity coefficient register, thereby incrementing the encoding quantity parameter.

The number of non-zero coefficients in the residual coefficient matrix may be counted as the encoding quantity parameter, and a result of "encoding quantity parameter*number of bits required to encode each coefficient" may be used to calculate a number of bits required to encode the non-zero coefficients in the residual coefficient matrix. In some examples, for direct current (DC) coefficients in the residual coefficient matrix, a number of bits required to encode the DC coefficients may be determined based on signs (positive or negative) of the DC coefficients. The DC coefficients may refer to the coefficients in the first row and first column of the residual coefficient matrix. When there are DC coefficients in the residual coefficient matrix, the encoding quantity parameter obtained in conjunction with the process described in FIG. 3 may subtract one, and the number of bits required to encode the non-zero coefficients in the residual coefficient matrix is calculated based on "(encoding quantity parameter−1)*number of bits required to encode each coefficient+encoding bit number for the DC coefficients".

In encoding formats such as AOMedia Video 1 (AV1), for coefficients whose absolute values are not greater than 14, 512 bits are required to encode each non-zero coefficient. Therefore, for coefficients whose absolute values are not greater than 14, a result of "encoding quantity parameter*512 bits" may be used to calculate the number of bits required to encode the non-zero coefficients in the residual coefficient matrix. For coefficients whose absolute values are greater than 14, more bits are required to encode the coefficients. Therefore, when there is a first residual coefficient whose absolute value is greater than 14 in the read residual coefficients, there is a need to determine a compensation encoding quantity parameter for the first residual coefficient.

According to the AV1 encoding standard, the compensation encoding quantity parameter for the first residual coefficient may be calculated based on (2*(msb(abs_level−14)+1)−1). abs_level is an absolute value of a coefficient value of the first residual coefficient, and msb(x) is a most significant bit of a binary representation of x. For example, when the coefficient value of the first residual coefficient is 15, the compensation encoding quantity parameter of the first residual coefficient may be calculated based on (2*(msb(1)+1)−1). When the coefficient value of the first residual coefficient is −17, the compensation encoding quantity parameter of the first residual coefficient may be calculated based on (2*(msb(3)+1)−1).

A value of a most significant bit of any binary representation may be obtained by calling a "bsr" instruction in assembly language. For example, a value of a most significant bit of a binary representation "0101" may be determined as 3 by using the "bsr" instruction. However, the bsr instruction in assembly language can process only one piece of data at a time and cannot implement parallel processing of a plurality of pieces of data. Therefore, the compensation encoding quantity parameter of the first residual coefficient cannot be obtained through parallel processing.

To solve the above problem, the present disclosure provides a novel method capable of determining a most significant bit of a binary representation in a parallel processing manner.

For read residual coefficients in the coefficient register, in response to the presence of one or more first residual coefficients greater than a predetermined threshold in the read residual coefficients, the method 500 shown in FIG. 5 may be performed to determine the compensation encoding quantity parameter of the first residual coefficient. For the AV1 encoding format, the predetermined threshold may be 14.

FIG. 5 is an exemplary flowchart of a method for determining a compensation encoding quantity parameter according to an embodiment of the present disclosure.

In step S502, a most significant bit of a binary representation of a difference between each of the one or more first residual coefficients and the predetermined threshold may be determined.

In some embodiments, differences between all read residual coefficients in the coefficient register and the predetermined threshold may be stored in a difference register that has a same size as the coefficient register.

FIG. 6 shows an example of a difference register according to an embodiment of the present disclosure.

As shown in FIG. 6, for the read residual coefficients in the coefficient register 610, a difference between the coefficient value of the residual coefficient at each position in the coefficient register 610 and the predetermined threshold 14 may be stored in the difference register 620. In some implementations, since the compensation encoding quantity parameter of only the first residual coefficient greater than the predetermined threshold needs to be calculated, in the difference register 620, only differences greater than zero may be retained, and differences less than zero may be determined as zero. In some other implementations, a threshold mask may be determined based on the coefficient values of the residual coefficients in the coefficient register, where the threshold mask indicates a specific position in the coefficient register where the coefficient value of the residual coefficient is greater than the predetermined threshold. After the values at all the positions in the difference register are processed in parallel, the threshold mask may be used to select, from the results at all the positions, a result that needs to be used as the compensation encoding quantity parameter.

It can be understood that, in the difference register, each difference is stored in binary mode. Therefore, a most significant bit of a binary representation of at least one difference in the difference register 620 may be obtained by processing using the difference register.

In some embodiments, for a binary representation whose most significant bit needs to be determined, the binary representation may be divided into a plurality of subsequences. A pre-constructed lookup table is searched based on a value of at least one bit sequence included in each of the plurality of subsequences that are obtained by division, to determine a value of a most significant bit of the subsequence. The most significant bit of the binary representation is determined based on the most significant bit of each subsequence and a position of the subsequence in the binary representation.

That the residual coefficient is a 16-bit binary representation is used as an example. The difference between the residual coefficient and the predetermined threshold may also be a 16-bit binary representation.

In some embodiments, a 16-bit binary representation of a difference to be processed may be divided into two subsequences, where each subsequence has a length of eight bits. In some other embodiments, the length of the subsequence and a number of subsequences may also be determined according to actual conditions. For example, a 16-bit binary representation may be divided into four subsequences, where each subsequence has a length of four bits. For another example, a 32-bit binary representation may be divided into two subsequences, where each subsequence has a length of 16 bits.

The pre-constructed lookup table may be searched based on a value of at least one bit sequence included in the plurality of subsequences that are obtained by division, to determine a value of a most significant bit of the subsequence. For example, the bit sequence may have a length of four bits. For a subsequence having a length of eight bits, the subsequence may be divided into two bit sequences each having a length of four bits. For a subsequence having a length of 16 bits, the subsequence may be divided into four bit sequences each having a length of four bits. It can be understood that the length of the bit sequence is not limited to four bits. Without departing from the principle of the present disclosure, the length of the bit sequence may alternatively be determined as other values, such as two bits, eight bits, etc.

A lookup table may be pre-constructed for at least one bit sequence in the subsequence. That a subsequence having a length of eight bits is divided into a first bit sequence and a second bit sequence each having a length of four bits is used as an example. A first lookup table may be constructed for the first bit sequence occupying the four high-order bits, a second lookup table may be constructed for the second bit sequence occupying the four low-order bits.

Therefore, the first lookup table may be searched based on a value of the first bit sequence, to determine a most significant bit of the first bit sequence. A second lookup table may be searched based on a value of the second bit sequence, to determine a most significant bit of the second bit sequence. The most significant bit of the subsequence is determined based on a larger value between the most significant bit of the first bit sequence and the most significant bit of the second bit sequence.

The first lookup table High4bits_Last1_Pos and the second lookup table Low4bits_Last1_Pos may be constructed based on the following structures:

Low4bits_Last1_Pos[16]={0, 1, 2, 2, 3, 3, 3, 3, 4, 4, 4, 4, 4, 4, 4, 4};

High4bits_Last1_Pos[16]={0, 5, 6, 6, 7, 7, 7, 7, 8, 8, 8, 8, 8, 8, 8, 8}.

Each of the first lookup table and the second lookup table includes 16 parameters, and each parameter corresponds to a most significant bit of a bit sequence.

FIG. 6 shows a 16-bit binary representation 630 of a difference 3. Through the utilization of the method provided in the present disclosure, the binary representation 630 may be divided into a first subsequence 631 occupying eight high-order bits and a second subsequence 632 occupying eight low-order bits.

For the first subsequence 631, the lookup table High4bits_Last1_Pos may be searched based on a value of the first bit sequence 0000 occupying four high-order bits of the first subsequence, and a value (that is, 0) stored at the [0000]$^{th}$ position in High4bits_Last1_Pos is determined as a most significant bit of the first bit sequence 0000. Similarly, the lookup table Low4bits_Last1_Pos may be searched based on a value of the second bit sequence 0000 of the first subsequence 631, and a value (that is, 0) stored at the [0000]$^{th}$ position in Low4bits_Last1_Pos is determined as a most significant bit of the second bit sequence 0000. Since the most significant bits of the first bit sequence and the second bit sequence of the first subsequence 631 are both zero, a larger value between the most significant bits of the first bit sequence and the second bit sequence of the first subsequence 631 is also zero. Therefore, it may be determined that a most significant bit of the first subsequence 631 is 0.

Similarly, for the second subsequence 632, the lookup table High4bits_Last1_Pos may be searched based on a value of a first bit sequence 0000 occupying four high-order bits of the second subsequence, and a value (that is, 0) stored at the [0000]$^{th}$ position in High4bits_Last1_Pos is determined as a most significant bit of the first bit sequence 0000. The lookup table Low4bits_Last1_Pos may be searched based on a value of a second bit sequence 0101 of the second subsequence 632, and a value (that is, 2) stored at the [0101]$^{th}$ position in Low4bits_Last1_Pos is determined as a most significant bit of the second bit sequence 0101. Since the most significant bits of the first bit sequence and the second bit sequence of the second subsequence 632 are respectively 0 and 2, a larger value between the most significant bits of the first bit sequence and the second bit sequence of the second subsequence 632 is 2. Therefore, it may be determined that a most significant bit of the second subsequence 632 is 2.

In some examples, an operation of searching a pre-constructed lookup table based on a value of a bit sequence may be performed by using a shuffle command of a central processing unit (CPU).

The most significant bit of each subsequence in the binary representation may be determined by using the above method. Further, a compensation significant bit for each subsequence may be determined based on a position of the subsequence in the binary representation. For example, for the first subsequence 631 and the second subsequence 632, since the first subsequence 631 occupies the eight high-order bits in the binary representation 630, and the second subsequence 632 occupies the eight low-order bits in the binary representation, a compensation significant bit of the first subsequence 631 is 8, and a compensation significant bit of the second subsequence 632 is 0.

An actual most significant bit of each subsequence may be determined based on a compensation significant bit of the subsequence and a most significant bit of the subsequence. For example, for the first subsequence 631, when the most significant bit of the first subsequence that is determined based on the values of the first bit sequence and the second bit sequence is not zero (such as 2), the most significant bit of the first subsequence may be compensated by adding the compensation significant bit 8 with the most significant bit, so as to obtain the actual most significant bit of the first subsequence after compensation that is 2+8=10. For another example, when the most significant bit of the first subsequence that is determined based on the values of the first bit sequence and the second bit sequence is zero (shown in FIG. 6), compensating the most significant bit with the compensation significant bit may be omitted, and the actual most significant bit of the first subsequence is determined as zero. For the second subsequence 632, since the compensation significant bit of the second subsequence is 0, the most significant bit of the second subsequence that is determined based on the values of the first bit sequence and the second bit sequence may be determined as an actual most significant bit of the second subsequence.

The most significant bit of the binary representation may be determined based on a maximum value of the actual most significant bits of each subsequence. The binary representation 630 shown in FIG. 6 is used as an example. The above method may be used to determine the actual most significant bit of the first subsequence 631 as 0 and the actual most significant bit of the second subsequence 632 as 3. Therefore, a maximum value of the actual most significant bits of the first subsequence 631 and the second subsequence 632 is 3. Therefore, it may be determined that the most significant bit of the binary representation 630 is 3.

The above processing is performed in parallel on the differences at the positions in the difference register 620, so that the most significant bit of the binary representation of the difference between the first residual coefficient at each position and the predetermined threshold can be obtained.

In step S504, a compensation encoding quantity parameter for each of the one or more first residual coefficients may be determined based on a corresponding most significant bit.

For example, for the AV1 encoding format, a compensation encoding parameter for the first residual coefficient may be determined based on (2*(binary most significant bit+1)–

1). For another example, the compensation encoding parameter of the first residual coefficient may also be determined based on other calculation methods according to actual encoding conditions.

In step S506, the encoding quantity parameter may be updated using the compensation encoding quantity parameters of the one or more first residual coefficients.

For example, the compensation encoding quantity parameter obtained in step S504 may be added to an encoding quantity coefficient at a corresponding position in the encoding quantity coefficient register shown in FIG. 4C, so as to update the encoding quantity coefficient. For another example, a separate compensation encoding quantity variable may be used to accumulate the compensation encoding quantity parameter of each first residual coefficient, and after all rows of the residual coefficient matrix are processed, a final compensation encoding quantity variable is used to update the sum for the encoding quantity coefficient register, so as to obtain the final encoding quantity parameter.

Figure 7:
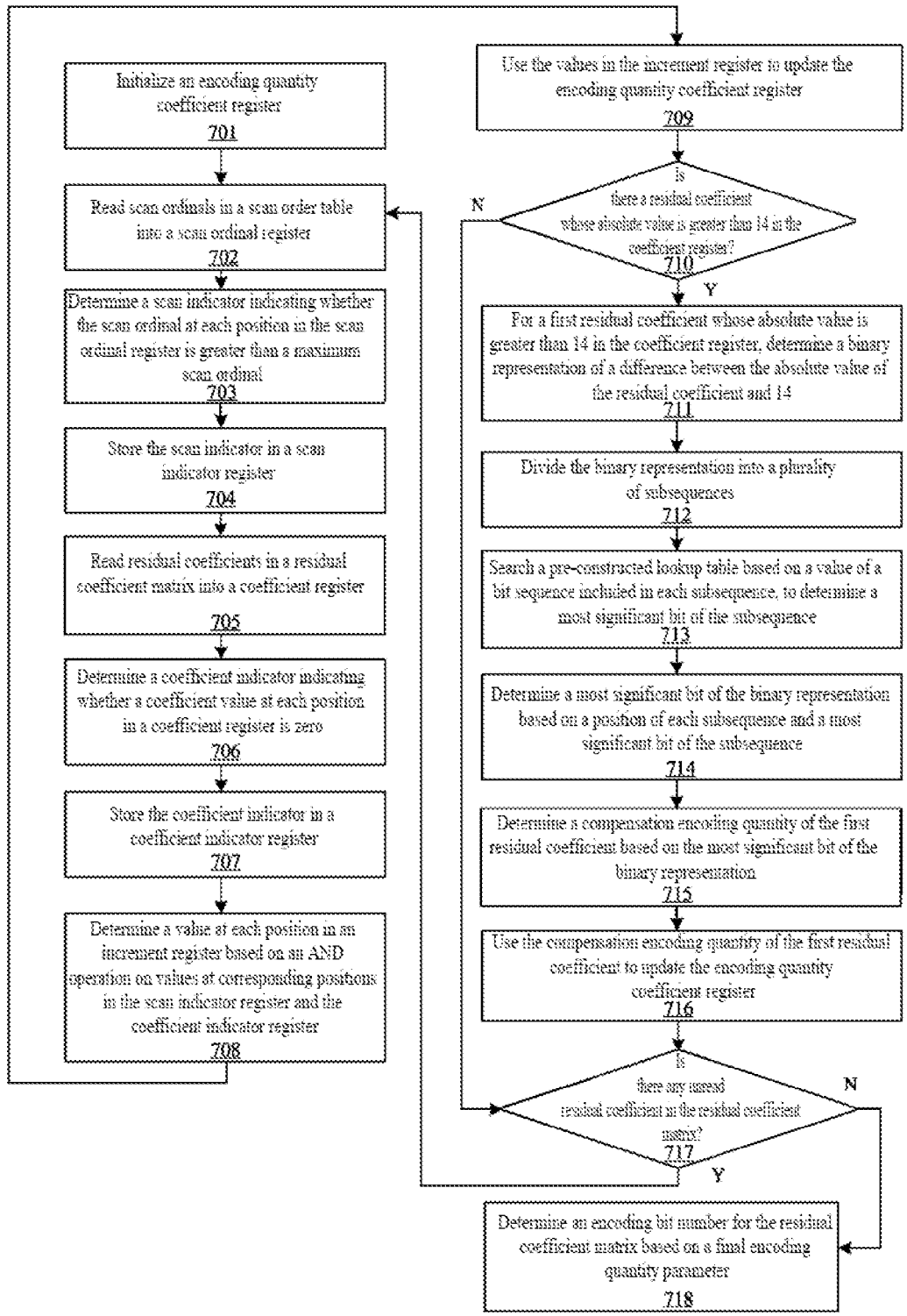
FIG. 7 is an exemplary flowchart of an image processing method according to an embodiment of the present disclosure.

FIG. 7 is an exemplary flowchart of the image processing method according to an embodiment of the present disclosure.

As shown in FIG. 7, in block 701, the encoding quantity coefficient register may be initialized to initialize the values at all the positions in the encoding quantity coefficient register to zero.

In block 702, the scan ordinals in the scan order table may be read into the scan ordinal register. The scan order table used here may be a scan order table for a predetermined scanning mode other than horizontal scanning, such as z-type scanning or a vertical scanning. The scan ordinal read here is a scan ordinal corresponding to a residual coefficient to be processed in this process. According to the principle of the present disclosure, the scan order table may be read in a horizontal scanning mode.

In block 703, a scan indicator indicating whether the scan ordinal at each position in the scan ordinal register is greater than the maximum scan ordinal may be determined. A first scan indicator indicates that the scan ordinal of the residual coefficient is not greater than the maximum scan ordinal, and a second scan indicator indicates that the scan ordinal of the residual coefficient is greater than the maximum scan ordinal.

In block 704, the scan indicator determined in block 703 may be stored at a corresponding position in the scan indicator register.

In block 705, the residual coefficients in the residual coefficient matrix may be read into the coefficient register, where the residual coefficient at each position in the coefficient register is in a one-to-one correspondence with a scan ordinal at a corresponding position in the scan ordinal register in block 702.

In block 706, a coefficient indicator indicating whether the coefficient value at each position in the coefficient register is zero may be determined. A first coefficient indicator indicates that the coefficient value of the residual coefficient is not zero, and a second coefficient indicator indicates that the coefficient value of the residual coefficient is zero.

In block 707, the coefficient indicator determined in block 706 may be stored at a corresponding position in the coefficient indicator register.

In block 708, a value at each position in the increment register may be determined based on an AND operation on values at corresponding positions in the scan indicator register and the coefficient indicator register. The value at each position in the increment register indicates whether the residual coefficient read at the position in the coefficient register is a non-zero coefficient to be scanned.

In block 709, the values in the increment register may be used to update the encoding quantity coefficient register. When the first scan indicator is represented as binary all ones, the second scan indicator is represented as binary all zeros, the first coefficient indicator is represented as binary all ones, and the second coefficient indicator is represented as binary all zeros, an increment of residual coefficients whose scan ordinals are less than the maximum scan ordinal and whose coefficient values are not zero is determined as −1. A value at each position in the encoding quantity coefficient register subtracts a value at a corresponding position in the increment register, so that the number of non-zero residual coefficients whose scan ordinals are less than the maximum scan ordinal and whose coefficient values are not zero in the currently read residual coefficients may be counted into the encoding quantity coefficient register.

In block 710, whether there is a residual coefficient whose absolute value is greater than 14 in the coefficient register is determined. When there is no residual coefficient whose absolute value is greater than 14 in the coefficient register, blocks 711 to 716 will skip to be performed. When there is a residual coefficient whose absolute value is greater than 14 in the coefficient register, blocks 711 to 716 will be performed.

In block 711, for the first residual coefficient whose absolute value is greater than 14 in the coefficient register, a binary representation of a difference between the absolute value of the residual coefficient and 14 is determined.

In block 712, the binary representation of the difference is divided into a plurality of subsequences. When the binary representation of the difference includes 16 bits, the binary representation may be divided into a first subsequence occupying eight high-order bits and a second subsequence occupying eight low-order bits.

In block 713, a pre-constructed lookup table may be searched based on a value of a bit sequence included in each subsequence, to determine a most significant bit of the subsequence. For example, four high-order bits and four low-order bits of the first subsequence may be determined as the first bit sequence and the second bit sequence, respectively. The first lookup table High4bits_Last1_Pos shown above may be searched based on the value of the first bit sequence, to obtain the most significant bit of the first bit sequence. Similarly, the value in the second lookup table Low4bits_Last1_Pos shown above may be searched based on the value of the second bit sequence. The most significant bit of the first subsequence may be determined based on a larger value between the most significant bit of the first bit sequence and the most significant bit of the second bit sequence. Based on a similar method, a table lookup may be performed for the first bit sequence and the second bit sequence in the second subsequence to determine the most significant bit of the second subsequence.

In block 714, the most significant bit of the binary representation may be determined based on a position of each subsequence and a most significant bit of the subsequence. For example, when the most significant bit of the first subsequence occupying the eight high-order bits is not 0, the value of the most significant bit of the first subsequence occupying the eight high-order bits may be added with 8 to obtain the actual most significant bit of the first subsequence. When the most significant bit of the first subsequence occupying the eight high-order bits is 0, 0 may be used as the actual most significant bit of the first subsequence. The most significant bit of the second subsequence occupying the eight low-order bits does not need to be adjusted, and the most significant bit of the second subsequence that is determined in block 713 may be determined as the actual most significant bit of the second subsequence. A larger value between the actual most significant bits of the first subsequence and the second subsequence may be determined as the most significant bit of the binary representation.

In block 715, the compensation encoding quantity parameter of the first residual coefficient may be determined based on the most significant bit of the binary representation. In the AV1 encoding format, the compensation encoding quantity parameter of the first residual coefficient may be calculated based on (2*(msb(abs_level−14)+1)−1). (msb(abs_level−14) is the value of the most significant bit of the binary representation obtained in block 714.

In block 716, the compensation encoding quantity parameter of the first residual coefficient may be used to update the encoding quantity coefficient register. For example, the compensation encoding quantity obtained in block 715 may be added to a position corresponding to the first residual coefficient in the encoding quantity coefficient register.

In block 717, whether there is any unread residual coefficient in the residual coefficient matrix may be determined. If a determining result is yes, it indicates that the residual coefficients in the residual coefficient matrix are not fully read, and block 712 may be performed and subsequent residual coefficients continue to be processed in the horizontal scanning mode. If the determining result is no, it indicates that the residual coefficients in the residual coefficient matrix are all processed, and block 718 may be performed.

In block 718, the encoding bit number for the residual coefficient matrix may be determined based on the final encoding quantity parameter. The values at the positions in the encoding quantity coefficient register that are obtained after all the residual coefficients in the residual coefficient matrix are processed may be summed to obtain the final encoding quantity parameter, and a product of the final encoding quantity parameter and a number of encoding bits per unit (such as 512) is used as the encoding bit number for the residual coefficient matrix.

Figure 8:
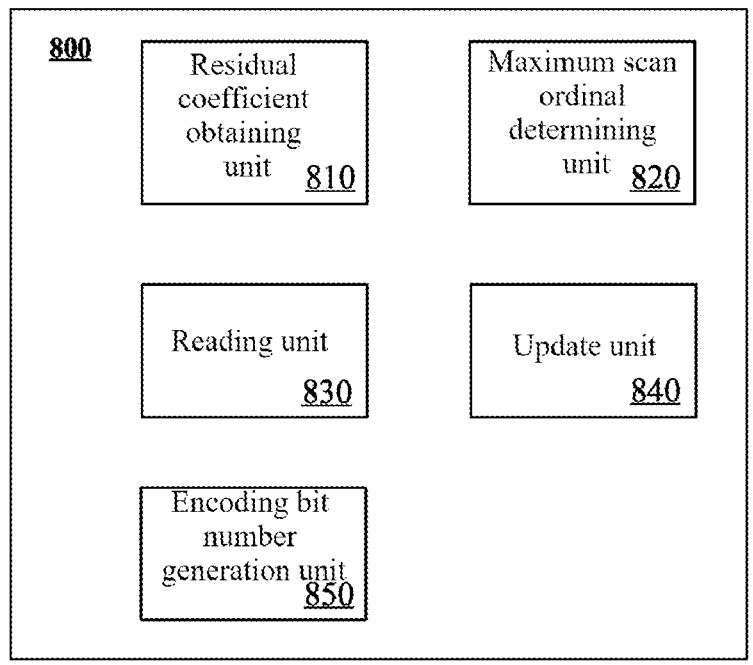
FIG. 8 is an exemplary block diagram of an image processing apparatus according to an embodiment of the present disclosure.

FIG. 8 is an exemplary block diagram of an image processing apparatus according to an embodiment of the present disclosure.

As shown in FIG. 8, the image processing apparatus 800 may include a residual coefficient obtaining unit 810, a maximum scan ordinal determining unit 820, a reading unit 830, an update unit 840, and an encoding bit number generation unit 850.

The residual coefficient obtaining unit 810 may be configured to obtain a residual coefficient matrix of a target image, where the residual coefficient matrix includes at least one non-zero coefficient. The maximum scan ordinal determining unit 820 may be configured to determine a maximum scan ordinal for the residual coefficient matrix. The reading unit 830 may be configured to sequentially read a predetermined number of residual coefficients in the residual coefficient matrix in a horizontal scanning mode. The update unit 840 may be configured to update an encoding quantity parameter for the residual coefficient matrix based on an ordinal comparison result between a scan ordinal of each of the read residual coefficients and the maximum scan ordinal and a coefficient value of each of the read residual coefficients. The encoding bit number generation unit 850 may be configured to determine an encoding bit number for the residual coefficient matrix based on a final encoding quantity parameter after reading all the residual coefficients in the residual coefficient matrix.

Through the utilization of the image processing apparatus provided in the present disclosure, for the residual coefficient matrix scanned in the mode that is different from the horizontal scanning mode, the residual coefficients in the residual coefficient matrix are read in the horizontal scanning mode, the ordinal comparison result between the scan ordinal corresponding to the read residual coefficient and the maximum scan ordinal for the residual coefficient matrix is obtained, so that whether the read residual coefficient is a residual coefficient to be scanned may be determined, and the encoding quantity parameter for the residual coefficient to be scanned may be further determined based on the coefficient value of the residual coefficient. Since the residual coefficients in the residual coefficient matrix are generally stored by rows, through the utilization of the method provided in the present disclosure, the residual coefficients in the residual coefficient matrix may be read in a horizontal scanning mode, thereby solving the problem of being unable to continuously read data in the case of non-horizontal scanning, and increasing a speed for reading data of the residual coefficient matrix.

It should be understood that the various units of the apparatus 800 shown in FIG. 8 may correspond to the steps in the method 100 described with reference to FIG. 1. Therefore, the operations, features, and advantages described for the method 100 above are also applicable to the apparatus 800 and the units included therein. For the sake of brevity, some operations, features, and advantages will not be repeated herein.

It should also be understood that herein, various technologies may be described herein in the general context of software and hardware elements or program modules. The various units described in FIG. 8 above may be implemented in hardware or in hardware combined with software and/or firmware. For example, these units may be implemented as computer program codes/instructions configured to be executed in one or more processors and stored in a computer-readable storage medium. Alternatively, these units may be implemented as hardware logics/circuits. For example, in some embodiments, one or more of the residual coefficient obtaining unit 810, the maximum scan ordinal determining unit 820, the reading unit 830, the update unit 840, and the encoding bit number generation unit 850 may be implemented together in a system on chip (SoC). The SoC may include an integrated circuit chip (which includes a processor (such as a central processing unit (CPU), a microcontroller, a microprocessor, and a digital signal processor (DSP)), a memory, one or more communication interfaces, and/or one or more components in other circuits), and may optionally execute the received program codes and/or include embedded firmware to execute functions.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program, where the computer program, when executed by a processor, implements the above method.

According to another aspect of the present disclosure, there is further provided a computer program product, including a computer program, where the computer program, when executed by a processor, implements the above method.

Figure 9:
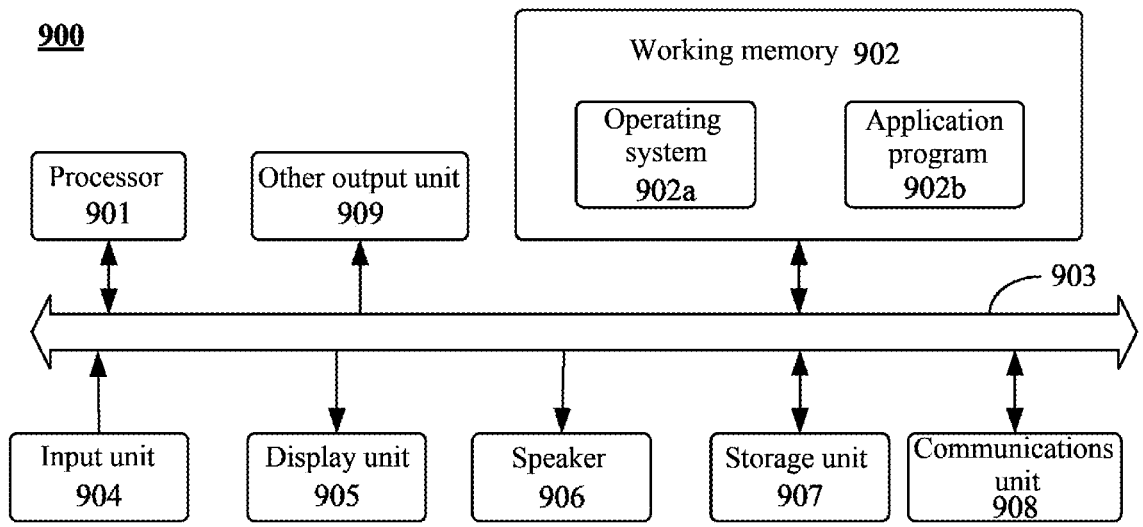
FIG. 9 is a block diagram of a structure of an exemplary electronic device that can be configured to implement an embodiment of the present disclosure.

Referring to FIG. 9, a structural block diagram of an electronic device 900 that may serve as a server or a client of the present disclosure is now described, which is an example of a hardware device that may be applied to various aspects of the present disclosure. The electronic device may be different types of computer device, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 9, the electronic device 900 may include at least one processor 901, a working memory 902, an input unit 904, a display unit 905, a speaker 906, a storage unit 907, a communications unit 908 and other output unit 909 that can communicate with each other through a system bus 903.

The processor 901 may be a single processing unit or a plurality of processing units, and all the processing units may include a single computing unit or a plurality of computing units or a plurality of cores. The processor 901 may be implemented as one or more microprocessors, microcomputers, micro-controllers, digital signal processors, central processing units, state machines, logic circuits, and/or any devices that manipulate signals based on operation instructions. The processor 901 may be configured to obtain and execute computer-readable instructions stored in the working memory 902, the storage unit 907, or other computer-readable media, such as program code of an operating system 902a, program code of an application program 902b, etc.

The working memory 902 and the storage unit 907 are examples of the computer-readable storage medium used for storing instructions, and the instructions are executed by the processor 901 to implement the various functions described above. The working memory 902 may include both a volatile memory and a non-volatile memory (e.g. a RAM, a ROM, etc.). In addition, the storage unit 907 may include a hard disk drive, a solid state drive, a removable medium, including external and removable drives, a memory card, a flash memory, a floppy disk, an optical disk (e.g. CD, DVD), a storage array, a network attached storage, a storage area network, etc. The working memory 902 and the storage unit 907 may be collectively referred to herein as a memory or a computer-readable storage medium, and may be a non-transitory medium capable of storing computer-readable and processor-executable program instructions as computer program code. The computer program code may be executed by the processor 901 as a specific machine configured to implement the operations and functions described in the examples herein.

The input unit 906 may be any category of device capable of entering information to the electronic device 900. The input unit 906 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit may be any type of device capable of presenting information, and may include, but is not limited to, a display unit 905, a speaker 906 and other output unit 909, and other output unit 909 may include, but is not limited to, a video/audio output terminal, a vibrator, and/or a printer. The communications unit 908 allows the electronic device 900 to exchange information/data with other devices via a computer network such as the Internet and/or various telecommunications networks, and may include, but is not limited to, a modem, a network interface card, an infrared communications device, a wireless communications transceiver, and/or a chipset, for example, a Bluetooth™ device, an 1302.6 device, a Wi-Fi device, a WiMax device, a cellular communications device, and/or the like.

The application program 902b in the working register 902 can be loaded to execute various methods and processing described above, such as steps S102 to step S110 in FIG. 1. For example, in some embodiments, the method 100 described above may be implemented as a computer software program, which is tangibly contained in a machine-readable medium, such as the storage unit 907. In some embodiments, a part or all of the computer program may be loaded and/or installed onto the electronic device 900 via the storage unit 907 and/or the communications unit 908. The computer program, when loaded and executed by the processor 901, may perform one or more steps of the method 100 described above. Alternatively, in other embodiments, the processor 901 may be configured, by any other suitable means (for example, by means of firmware), to perform the method 100.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely exemplary embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An image processing method, comprising:
  obtaining a residual coefficient matrix of a target image, wherein the residual coefficient matrix comprises at least one non-zero coefficient;
  determining a maximum scan ordinal for the residual coefficient matrix;
  sequentially reading a predetermined number of residual coefficients in the residual coefficient matrix in a horizontal scanning mode;
  with respect to the read residual coefficients, updating an encoding quantity parameter for the read residual coefficients based on an ordinal comparison result between a scan ordinal of each of the read residual coefficients and the maximum scan ordinal and a coefficient value of each of the read residual coefficients, wherein the scan ordinal is determined based on a predetermined scanning mode that is different from the horizontal scanning mode; and
  determining an encoding bit number of the residual coefficient matrix based on a final encoding quantity parameter after reading all residual coefficients in the residual coefficient matrix,
  wherein the updating an encoding quantity parameter for the read residual coefficients further comprises:
  in response to determining that the read residual coefficients comprise one or more first residual coefficients that are greater than a predetermined threshold, with respect to each of the one or more first residual coefficients, determining a most significant bit of a binary representation of a difference between the first residual coefficients and the predetermined threshold,
  determining a compensation encoding quantity parameter for the first residual coefficient based on a corresponding most significant bit, and
  updating the encoding quantity parameter based on the compensation encoding quantity parameters of the first residual coefficient.

2. The image processing method according to claim 1, wherein the updating an encoding quantity parameter for the read residual coefficients comprises:
  determining a scan indicator of each of the read residual coefficients based on the ordinal comparison result between the scan ordinal of each of the read residual coefficients and the maximum scan ordinal, wherein a first scan indicator indicates that the scan ordinal of the residual coefficient is not greater than the maximum scan ordinal, and a second scan indicator indicates that the scan ordinal of the residual coefficient is greater than the maximum scan ordinal;
  determining a coefficient indicator of each of the read residual coefficients based on a coefficient comparison result between the coefficient value of each of the read residual coefficients and zero, wherein a first coefficient indicator indicates that the coefficient value of the residual coefficient is not zero, and a second coefficient indicator indicates that the coefficient value of the residual coefficient is zero; and with respect to each of the read residual coefficients, increasing the encoding quantity parameter in response to determining that the scan indicator of the read residual coefficient indicates that the scan ordinal of the residual coefficient is not greater than the maximum scan ordinal and determining that the coefficient indicator of the residual coefficient indicates that the coefficient value of the residual coefficient is not zero.

3. The image processing method according to claim 2, where the determining a scan indicator of each of the read residual coefficients based on the ordinal comparison result between the scan ordinal of each of the read residual coefficients and the maximum scan ordinal comprises:

reading, into a scan ordinal register in a horizontal scanning mode, a predetermined number of scan ordinals respectively corresponding to the predetermined number of residual coefficients; and with respect to each position in the scan ordinal register, in response to determining that a scan ordinal at the position is not greater than the maximum scan ordinal, identifying the first scan indicator as a scan indicator corresponding to the position in a scan indicator register, or in response to determining that the scan ordinal at the position is greater than the maximum scan ordinal, identifying the second scan indicator as the scan indicator corresponding to the position in the scan indicator register, wherein the second scan indicator is different from the first scan indicator.

4. The image processing method according to claim 2, wherein the determining a coefficient indicator of each of the read residual coefficients based on a coefficient comparison result between the coefficient value of each of the read residual coefficients and zero comprises:

reading the predetermined number of residual coefficients into a coefficient register in the horizontal scanning mode; and with respect to each position in the coefficient register, in response to determining that a coefficient value of a residual coefficient at the position is not equal to zero, identifying the first coefficient indicator as a coefficient indicator corresponding to the position in a coefficient indicator register, or in response to determining that the coefficient value of the residual coefficient at the position is equal to zero, identifying the second coefficient indicator as the coefficient indicator corresponding to the position in the coefficient indicator register, wherein the second coefficient indicator is different from the first coefficient indicator.

5. The image processing method according to claim 2, wherein the first scan indicator is represented by binary all ones, wherein the second scan indicator is represented by binary all zeros, wherein the first coefficient indicator is represented by binary all ones, and wherein the second coefficient indicator is represented by binary all zeros.

6. The image processing method according to claim 2, wherein the encoding quantity parameter comprises a predetermined number of encoding quantity coefficients stored in an encoding quantity coefficient register, wherein each encoding quantity coefficient is used for a residual coefficient at a corresponding position in the coefficient register, and wherein with respect to each of the read residual coefficients, increasing the encoding quantity parameter in response to determining that the scan indicator of the read residual coefficient indicates that the scan ordinal of the residual coefficient is not greater than the maximum scan ordinal and determining that the coefficient indicator of the residual coefficient indicates that the coefficient value of the residual coefficient is not zero comprises:

performing an AND operation on a coefficient indicator stored at each position in a coefficient indicator register and a scan indicator stored at a corresponding position in a scan indicator register to obtain an increment of an encoding quantity coefficient stored at each position in the encoding quantity coefficient register; and updating each encoding quantity coefficient in the encoding quantity coefficient register using the increment.

7. The image processing method according to claim 1, wherein the determining a most significant bit of a binary representation of a difference between the first residual coefficients and the predetermined threshold comprises:

dividing the binary representation into a plurality of subsequences;

with respect to each of the plurality of subsequences, determining a value of a most significant bit of the subsequence by searching a pre-constructed lookup table based on a value of at least one bit sequence comprised in the subsequence; and determining the most significant bit of the binary representation based on the most significant bit of each subsequence and a position of the subsequence in the binary representation.

8. The image processing method according to claim 7, wherein the with respect to each of the plurality of subsequences, determining a value of a most significant bit of the subsequence by searching a pre-constructed lookup table based on a value of at least one bit sequence comprised in the subsequence comprises:

dividing the subsequence into a first bit sequence and a second bit sequence;

determining a most significant bit of the first bit sequence by searching a first lookup table based on a value of the first bit sequence;

determining a most significant bit of the second bit sequence by searching a second lookup table based on a value of the second bit sequence; and determining the most significant bit of the subsequence based on a larger value between the most significant bit of the first bit sequence and the most significant bit of the second bit sequence.

9. The image processing method according to claim 8, wherein each of the plurality of subsequences has a length of eight bits, the first bit sequence has a length of four bits, and the second bit sequence has a length of four bits.

10. The image processing method according to claim 7, wherein the determining the most significant bit of the binary representation based on the most significant bit of each subsequence and a position of the subsequence in the binary representation comprises:

with respect to each of the plurality of subsequences, determining a compensation significant bit for the subsequence based on the position of the subsequence in the binary representation;

with respect to each of the plurality of subsequences, determining an actual most significant bit of the subsequence based on the compensation significant bit of the subsequence and the most significant bit of the subsequence; and determining the most significant bit of the binary representation based on a maximum value of the actual most significant bit of each subsequence.

11. The image processing method according to claim 1, wherein the determining a maximum scan ordinal for the residual coefficient matrix comprises:
   determining the maximum scan ordinal based on the predetermined scanning mode for the residual coefficient matrix.

12. The image processing method according to claim 11, wherein the determining the maximum scan ordinal based on a predetermined scanning mode for the residual coefficient matrix comprises:
   determining a position of a last non-zero coefficient in the residual coefficient matrix based on a block end indication identifier; and
   determining the maximum scan ordinal based on a scan order table for the residual coefficient matrix that is corresponding to the predetermined scanning mode and the position of the last non-zero coefficient in the residual coefficient matrix.

13. The image processing method according to claim 1, wherein the predetermined scanning mode is vertical scanning or z-type scanning.

14. The image processing method according to claim 1, further comprising:
   comparing the encoding bit number of the residual coefficient matrix and an encoding bit number of another residual coefficient matrix of the target image, wherein the residual coefficient matrix and the another residual coefficient matrix are obtained using different prediction methods; and
   encoding the target image based on one of the residual coefficient matrix and the another residual coefficient matrix that has a smaller encoding bit number.

15. An electronic device, comprising:
   at least one processor; and a memory communicatively connected to the at least one processor, wherein the memory stores a computer program that, when executed by the at least one processor, causes the at least one processor to implement operations comprising:
   obtaining a residual coefficient matrix of a target image, wherein the residual coefficient matrix comprises at least one non-zero coefficient;
   determining a maximum scan ordinal for the residual coefficient matrix;
   sequentially reading a predetermined number of residual coefficients in the residual coefficient matrix in a horizontal scanning mode;
   with respect to the read residual coefficients, updating an encoding quantity parameter for the residual coefficient matrix based on an ordinal comparison result between a scan ordinal of each of the read residual coefficients and the maximum scan ordinal and a coefficient value of each of the read residual coefficients, wherein the scan ordinal is determined based on a predetermined scanning mode that is different from the horizontal scanning mode; and
   determining an encoding bit number of the residual coefficient matrix based on a final encoding quantity parameter after reading all residual coefficients in the residual coefficient matrix,
   wherein the updating an encoding quantity parameter for the read residual coefficients further comprises:
   in response to determining that the read residual coefficients comprise one or more first residual coefficients that are greater than a predetermined threshold, with respect to each of the one or more first residual coefficients, determining a most significant bit of a binary representation of a difference between the first residual coefficients and the predetermined threshold,
   determining a compensation encoding quantity parameter for the first residual coefficient based on a corresponding most significant bit, and
   updating the encoding quantity parameter based on the compensation encoding quantity parameters of the first residual coefficient.

16. The electronic device according to claim 15, wherein the updating an encoding quantity parameter for the read residual coefficients comprises:
   determining a scan indicator of each of the read residual coefficients based on the ordinal comparison result between the scan ordinal of each of the read residual coefficients and the maximum scan ordinal, wherein a first scan indicator indicates that the scan ordinal of the residual coefficient is not greater than the maximum scan ordinal, and a second scan indicator indicates that the scan ordinal of the residual coefficient is greater than the maximum scan ordinal;
   determining a coefficient indicator of each of the read residual coefficients based on a coefficient comparison result between the coefficient value of each of the read residual coefficients and zero, wherein a first coefficient indicator indicates that the coefficient value of the residual coefficient is not zero, and a second coefficient indicator indicates that the coefficient value of the residual coefficient is zero; and
   with respect to each of the read residual coefficients, increasing the encoding quantity parameter in response to determining that the scan indicator of the read residual coefficient indicates that the scan ordinal of the residual coefficient is not greater than the maximum scan ordinal and determining that the coefficient indicator of the residual coefficient indicates that the coefficient value of the residual coefficient is not zero.

17. The electronic device according to claim 15, wherein the determining a most significant bit of a binary representation of a difference between the first residual coefficients and the predetermined threshold comprises:
   dividing the binary representation into a plurality of subsequences;
   with respect to each of the plurality of subsequences, determining a value of a most significant bit of the subsequence by searching a pre-constructed lookup table based on a value of at least one bit sequence comprised in the subsequence; and
   determining the most significant bit of the binary representation based on the most significant bit of each subsequence and a position of the subsequence in the binary representation.

18. The electronic device according to claim 15, the operations further comprising:
   comparing the encoding bit number of the residual coefficient matrix and an encoding bit number of another residual coefficient matrix of the target image, wherein the residual coefficient matrix and the another residual coefficient matrix are obtained using different prediction methods; and
   encoding the target image based on one of the residual coefficient matrix and the another residual coefficient matrix that has a smaller encoding bit number.

19. A non-transitory computer-readable storage medium, storing a computer program, wherein the computer program, when executed by a processor, causes the processor to implement operations comprising:

obtaining a residual coefficient matrix of a target image, wherein the residual coefficient matrix comprises at least one non-zero coefficient;

determining a maximum scan ordinal for the residual coefficient matrix;

sequentially reading a predetermined number of residual coefficients in the residual coefficient matrix in a horizontal scanning mode;

with respect to the read residual coefficients, updating an encoding quantity parameter for the residual coefficient matrix based on an ordinal comparison result between a scan ordinal of each of the read residual coefficients and the maximum scan ordinal and a coefficient value of each of the read residual coefficients, wherein the scan ordinal is determined based on a predetermined scanning mode that is different from the horizontal scanning mode; and determining an encoding bit number of the residual coefficient matrix based on a final encoding quantity parameter after reading all residual coefficients in the residual coefficient matrix, wherein the updating an encoding quantity parameter for the read residual coefficients further comprises:

in response to determining that the read residual coefficients comprise one or more first residual coefficients that are greater than a predetermined threshold, with respect to each of the one or more first residual coefficients, determining a most significant bit of a binary representation of a difference between the first residual coefficients and the predetermined threshold, determining a compensation encoding quantity parameter for the first residual coefficient based on a corresponding most significant bit, and updating the encoding quantity parameter based on the compensation encoding quantity parameters of the first residual coefficient.

20. The non-transitory computer-readable storage medium according to claim 19, wherein the updating an encoding quantity parameter for the read residual coefficients comprises:

determining a scan indicator of each of the read residual coefficients based on the ordinal comparison result between the scan ordinal of each of the read residual coefficients and the maximum scan ordinal, wherein a first scan indicator indicates that the scan ordinal of the residual coefficient is not greater than the maximum scan ordinal, and a second scan indicator indicates that the scan ordinal of the residual coefficient is greater than the maximum scan ordinal;

determining a coefficient indicator of each of the read residual coefficients based on a coefficient comparison result between the coefficient value of each of the read residual coefficients and zero, wherein a first coefficient indicator indicates that the coefficient value of the residual coefficient is not zero, and a second coefficient indicator indicates that the coefficient value of the residual coefficient is zero; and with respect to each of the read residual coefficients, increasing the encoding quantity parameter in response to determining that the scan indicator of the read residual coefficient indicates that the scan ordinal of the residual coefficient is not greater than the maximum scan ordinal and determining that the coefficient indicator of the residual coefficient indicates that the coefficient value of the residual coefficient is not zero.

* * * * *